US010082771B2

(12) United States Patent
Nakazawa (10) Patent No.: US 10,082,771 B2
(45) Date of Patent: Sep. 25, 2018

(54) MACHINE LEARNING METHOD AND MACHINE LEARNING APPARATUS LEARNING OPERATING COMMAND TO ELECTRIC MOTOR AND MACHINE TOOL INCLUDING MACHINE LEARNING APPARATUS

(71) Applicant: FANUC CORPORATION, Yamanashi (JP)

(72) Inventor: Yasuyuki Nakazawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/278,032

(22) Filed: Sep. 28, 2016

(65) Prior Publication Data
US 2017/0090430 A1     Mar. 30, 2017

(30) Foreign Application Priority Data

Sep. 29, 2015   (JP) .................................. 2015-191674

(51) Int. Cl.
| | | |
|---|---|---|
| G05B 13/02 | (2006.01) | |
| H02P 29/40 | (2016.01) | |
| H02P 29/60 | (2016.01) | |
| G06N 99/00 | (2010.01) | |
| H02P 5/00 | (2016.01) | |
| G06N 3/08 | (2006.01) | |
| H02P 29/02 | (2016.01) | |

(52) U.S. Cl.
CPC ....... *G05B 13/028* (2013.01); *G05B 13/0265* (2013.01); *G06N 3/084* (2013.01); *G06N 99/005* (2013.01); *H02P 5/00* (2013.01); *H02P 29/40* (2016.02); *H02P 29/60* (2016.02); *H02P 29/02* (2013.01)

(58) Field of Classification Search
CPC ...... G06N 5/045; G06N 99/005; H02P 27/08; H02P 29/68; G02B 13/02; G05B 13/028
See application file for complete search history.

(56) References Cited

U.S. PATENT DOCUMENTS

| | | | |
|---|---|---|---|
| 2008/0133439 A1 | 6/2008 | Ikeda | |
| 2011/0063122 A1* | 3/2011 | Matsubara | ........... G05B 19/406 340/679 |
| 2011/0222980 A1* | 9/2011 | Kuo | ................... B23Q 11/0039 409/80 |

FOREIGN PATENT DOCUMENTS

| | | |
|---|---|---|
| CN | 101219521 A | 7/2008 |
| CN | 101738981 A | 6/2010 |

(Continued)

OTHER PUBLICATIONS

"Industry 4.0 is no fear", The Solutions Magazine for Design and Manufacturing, vol. 732, pp. 42 to 44, Nikkei Business Publications, Inc., Sep. 1, 2015.

*Primary Examiner* — Muhammad S Islam
(74) *Attorney, Agent, or Firm* — Hauptman Ham, LLP (57) ABSTRACT

A machine learning apparatus learning an operating command to an electric motor. The machine learning apparatus is configured to learn an operating command to an electric motor. The machine learning apparatus comprises a status observing part observing an amount of power fed to an electric motor, a temperature of the electric motor, a load of the electric motor, and vibration of the electric motor as status variables and a learning part learning an operating command to an electric motor according to a set of training data prepared based on the status variables.

6 Claims, 3 Drawing Sheets

(56) References Cited

FOREIGN PATENT DOCUMENTS

| | | | |
|---|---|---|---|
| CN | 103823409 A | 5/2014 |
| CN | 103984287 A | 8/2014 |
| JP | 6-335843 A | 12/1994 |
| JP | 2006-288076 A | 10/2006 |
| JP | 2014-156005 A | 8/2014 |
| WO | 2014/115395 A1 | 7/2014 |
| WO | 2015/087455 A1 | 6/2015 |

* cited by examiner

MACHINE LEARNING METHOD AND MACHINE LEARNING APPARATUS LEARNING OPERATING COMMAND TO ELECTRIC MOTOR AND MACHINE TOOL INCLUDING MACHINE LEARNING APPARATUS

RELATED APPLICATIONS

The present application claims priority to Japanese Patent Application Number 2015-191674 filed Sep. 29, 2015, the disclosure of which is hereby incorporated by reference herein in its entirety.

BACKGROUND OF INVENTION

1. Field of the Invention

The present invention relates to a machine learning method and machine learning apparatus learning an operating command to an electric motor and a machine tool including that machine learning apparatus.

2. Description of the Related Art

When using a machine tool for processing, to raise the processing precision, prevention of overload, overheating, and chatter vibration is sought. In the past, operators have changed the feed speed of the tool or speed of the spindle or corrected the temperature to thereby try to improve the processing precision based on their own experience.

International Patent Publication No. WO 2014/115395A discloses a machine tool configured to correct a speed of a spindle or change a depth of cut when chatter vibration is detected. International Patent Publication No. WO 2015/087455A discloses a numerical controller designed to change an acceleration of an electric motor during operation in accordance with inertia of a workpiece, a load applied the electric motor, etc.

SUMMARY OF INVENTION

However, according to the above-mentioned known art, predetermined correction processing is performed according to specific conditions, so it was difficult to always realize a high processing precision. Therefore, control of a machine tool that does not require a correction operation by an operator and that is able to always realize a high processing precision has been sought.

According to the present invention, there is provided a machine learning apparatus learning an operating command to an electric motor, the machine learning apparatus comprising a status observing part observing an amount of power fed to an electric motor, a temperature of the electric motor, a load of the electric motor, and vibration of the electric motor as status variables and a learning part learning an operating command to an electric motor according to a set of training data prepared based on the status variables. In a preferred embodiment of the present invention, the learning part comprises a reward calculating part calculating a reward in accordance with the amount of power fed, temperature, load, and vibration and a function updating part updating a function for determining the operating command based on the reward.

In a preferred embodiment of the present invention, the reward calculating part is configured to calculate the reward based on a difference of the amount of power fed and a predetermined amount of power fed, a difference of the temperature and a predetermined temperature, a difference of the load and a predetermined load, and a difference of the vibration and a predetermined vibration.

In a preferred embodiment of the present invention, the function updating part is configured to update an action value table based on the reward.

In a preferred embodiment of the present invention, the learning part is configured to learn the operating command in accordance with a set of training data prepared for a plurality of electric motors.

In a preferred embodiment of the present invention, there is provided a machine tool comprising the machine learning apparatus, a drive shaft or rotating shaft driven by at least one first electric motor, and a spindle driven by at least one second electric motor, in which machine tool, the machine learning apparatus further comprising a decision-making part performing at least one of any of feed speed correction, spindle speed correction, acceleration/deceleration time constant correction, and position correction based on results of learning of the learning part, and the machine tool is configured to control the first electric motor and the second electric motor in accordance with an operating command corrected by the decision-making part.

In a preferred embodiment of the present invention, the status observing part is configured to observe a temperature and vibration of a spindle head as additional status variables, and the reward calculating part is configured to calculate a reward based on a difference of the temperature of the spindle head and a predetermined temperature and a difference of the vibration of the spindle head and a predetermined vibration.

According to the present invention, there is provided a machine learning method learning an operating command to an electric motor, the machine learning method comprising observing an amount of power fed to an electric motor, a temperature of the electric motor, a load of the electric motor, and vibration of the electric motor as status variables and learning an operating command to an electric motor according to a set of training data prepared based on the status variables.

BRIEF DESCRIPTION OF DRAWINGS

These and other objects, features, and advantages of the present invention will become clearer by referring to the detailed description of illustrative embodiments of the present invention shown in the attached drawings.

DETAILED DESCRIPTION

Figure 1:
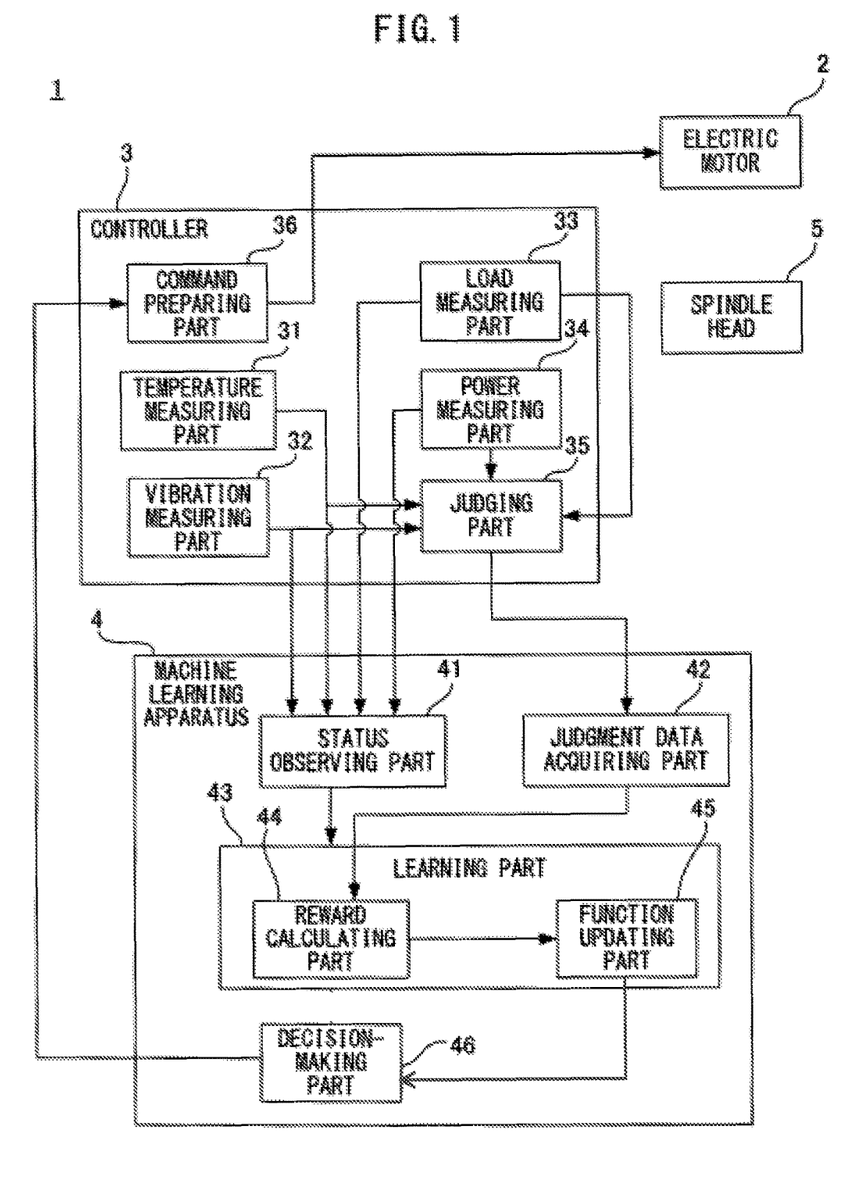
FIG. 1 is a block diagram of an example of the configuration of a machine tool according to one embodiment.

Below, embodiments of the present invention will be explained referring to the attached drawings. FIG. 1 is a block diagram showing an example of the configuration of a machine tool according to an embodiment. A machine tool 1 includes an electric motor 2, a controller 3 controlling the electric motor 2, and a machine learning apparatus 4 learning an operating command to an electric motor 2.

An electric motor 2 is provided corresponding to each axis of the machine tool 1. The electric motor 2 is used for driving a spindle head 5 to which a tool is attached. Further, the electric motor 2 may also be used for driving a drive shaft for making the spindle head 5 move or a rotary shaft for making it rotate at each axial direction of a coordinate system fixed in the work space. Alternatively, the electric motor 2 may be used to drive a drive shaft for making a table on which a workpiece is placed move in the work space or a rotary shaft for making it rotate. The term "electric motor" used in this Description includes the plurality of electric motors 2 used in a machine tool 1, that is, both spindle-use electric motors and feed shaft-use electric motors.

The controller 3 is a digital computer including a CPU, memory, and interface. The CPU performs processing for realizing the various functions of the controller 3. The memory includes a ROM, RAM, and nonvolatile memory. The ROM stores a system program controlling the functions of the controller 3. The RAM is used to temporarily store detection values of various sensors, processing results of the CPU, etc. The nonvolatile memory stores a control program for preparing a command to an electric motor 2 and various parameters etc.

As shown in FIG. 1, the controller 3 comprises a temperature measuring part 31, vibration measuring part 32, load measuring part 33, power measuring part 34, judging part 35, and command preparing part 36.

The temperature measuring part 31 measures the temperature of the electric motor 2. The temperature measuring part 31 measures the temperature of the electric motor 2 based on the output value of a temperature sensor (not shown) provided at any position of the electric motor 2 able to detect a temperature change, for example, a housing of the electric motor 2. In one embodiment, the temperature measuring part 31 may be configured to use a separately provided temperature sensor to further measure the temperature of the spindle head 5.

The vibration measuring part 32 measures the vibration of the electric motor 2 based on the output value of any vibration sensor. In one embodiment, the vibration measuring part 32 may be configured to use a separately provided vibration sensor to further measure the vibration of the spindle head 5.

The load measuring part 33 measures the load of the electric motor 2. For example, the load measuring part 33 can calculate the load from the amount of current supplied to an electric motor 2 when the electric motor 2 performs a predetermined operation.

The power measuring part 34 measures the amount of power fed from an amplifier (not shown) of the controller 3 to an electric motor 2.

The judging part 35 calculates the differences between a plurality of measurement values acquired by the controller 3 and comparative values corresponding to the respective measurement values and outputs them as judgment data. The judged measurement values include the temperature of the electric motor 2 measured by the temperature measuring part 31, the vibration of the electric motor 2 measured by the vibration measuring part 32, the load of the electric motor 2 measured by the load measuring part 33, and the power measured by the power measuring part 34.

The comparative value corresponding to the temperature of the electric motor 2 is set so as to express a temperature where it is deemed that the electric motor 2 is overheating. The comparative value corresponding to the vibration of the electric motor 2 is set so as to express the vibration where it is deemed that chatter vibration has occurred. The comparative value corresponding to the load of the electric motor 2 is set so as to express the load where it is deemed that the electric motor 2 is in an overloaded state. The comparative value corresponding to the amount of power fed to an electric motor 2 is set so as to express the power corresponding to the limit of the power feed capacity.

In this way, the judgment data prepared by the judging part 35 is data enabling judgment of any overheating of the electric motor 2, overload, overshoot of the power feed capacity, and occurrence of chatter vibration.

In the case of an embodiment where the temperature measuring part 31 is configured to measure the temperature of the spindle head 5, the judging part 35 is further configured to calculate the difference between the temperature of the spindle head 5 and a temperature corresponding to this. In the case of an embodiment where the temperature measuring part 31 is configured to measure the vibration of the spindle head 5, the judging part 35 is further configured to calculate the difference between the vibration of the spindle head 5 and a value corresponding to this.

The command preparing part 36 prepares an operating command to an electric motor 2. The command preparing part 36 prepares this in accordance with an operating program and parameters stored in a nonvolatile memory. The operating command prepared by the command preparing part 36 sometimes is corrected by correction processing determined by the decision-making part 46 of the machine learning apparatus 4 explained later.

The machine learning apparatus 4 is used for learning an operating command to an electric motor 2 in accordance with the status of the machine tool 1. As shown in FIG. 1, the machine learning apparatus 4 includes a status observing part 41, judgment data acquiring part 42, learning part 43, and decision-making part 46.

The status observing part 41 observes the amount of power fed to a electric motor 2, the temperature of the electric motor 2, the load of the electric motor 2, and the vibration of the electric motor 2 as status variables. In one embodiment, the status observing part 41 may be configured to observe the temperature and vibration of the spindle head 5 as additional status variables.

The judgment data acquiring part 42 acquires judgment data corresponding to status variables (measurement values) observed by the status observing part 41 from the judging part 35.

The learning part 43 learns an operating command to an electric motor 2 in accordance with a set of training data prepared based on the status variables.

The decision-making part 46 corrects an operating command to an electric motor 2 based on the learning results of the learning part 43. The decision-making part 46 is configured to perform at least one of any of feed speed correction, spindle speed correction, acceleration/deceleration time constant correction, and position correction.

The machine learning apparatus 4 may be a separate digital computer from the controller 3 or may be built into the controller 3. In the latter case, the machine learning apparatus 4 performs machine learning using the CPU and memory of the controller 3.

In one embodiment, the machine learning apparatus 4 may be provided at a location away from the electric motor 2 and the controller 3. In that case, the machine learning apparatus 4 is connected through a network to the controller 3. Alternatively, the machine learning apparatus 4 may be present in a cloud server.

As shown in FIG. 1, the learning part 43 includes a reward calculating part 44 and a function updating part 45.

The reward calculating part 44 calculates a reward based on judgment data of the measurement values acquired by the judgment data acquiring part 42.

The function updating part 45 updates a function for determining an operating command to an electric motor 2 based on the reward calculated by the reward calculating part 44. In one embodiment, the function updating part 44 may be configured to change an action value table based on the above-mentioned reward. The action value table has the form of a reference table and is data linking the status variables and action values corresponding to the same.

Figure 2:
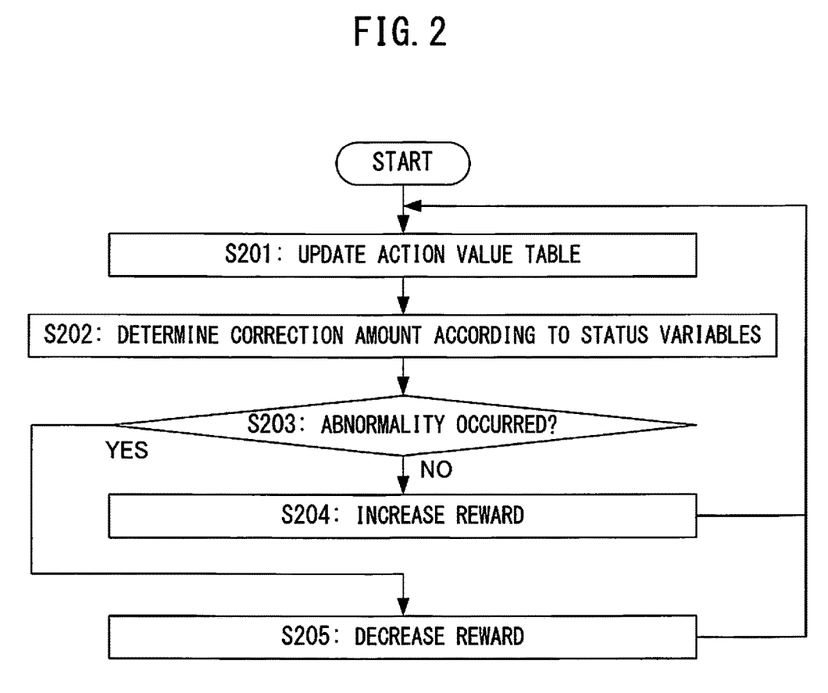
FIG. 2 is a flow chart showing a flow of a learning process in a machine learning apparatus.

Referring to FIG. 2, a machine learning method performed by a machine learning apparatus 4 according to one embodiment will be explained.

At step S201, the action value table is updated. When step S201 is first performed, any initial value is input to the action value table. At step S202, the decision-making part 46 determines the amount of correction of the operating command in accordance with the status variables. At the initial stage of machine learning, the decision-making part 46 may randomly determine the amount of correction of the operating command.

At step S203, it is judged if an abnormality has occurred in the machine tool 1. Here, an "abnormality" in the machine tool 1 means a state corresponding to at least one of a time when the amount of power fed to an electric motor 2 exceeds an allowable value, when the load on the electric motor 2 is excessively large, when the temperature of the electric motor 2 is excessively high, when chatter vibration occurs at the machine tool 1, and when the temperature of the spindle head 5 is excessively high. Note that the judgment at step S203 is performed based on the judgment data prepared by the judging part 35 of the controller 3.

When no abnormality has occurred (when the result of judgment at step S203 is no), the routine proceeds to step S204 where the reward calculating part 44 makes the reward for that action (correction processing for operating command) increase. On the other hand, when an abnormality has occurred (when result of judgment at step S203 is yes), the routine proceeds to step S205 where the reward calculating part 44 makes the reward for that action decrease.

After the calculation of the reward at step S204 or S205, the routine returns to step S201 where the action value table is updated. The processing from step S201 to S205 is repeated until a sufficient learning effect by the machine learning is obtained.

Here, the machine learning apparatus 4 will be explained in detail. The machine learning apparatus 4 has the function of extracting from the set of data input to the apparatus useful rules or knowledgeable expressions among it, judgment criteria, etc. by analysis and outputs the results of judgment and learns knowledge. There are various techniques, but roughly speaking, they are divided into "supervised learning", "unsupervised training) and "reinforcement learning". Further, in realizing these techniques, there is the technique called "deep learning" learning extraction of feature quantities as well.

"Supervised learning" gives a large amount of sets of certain data of inputs and results (labels) to the learning apparatus and thereby can learn the features in these data sets and inductively acquire a model predicting results from inputs, that is, the relativity. In the present embodiment, it is possible to use this for the part for correcting a command to an electric motor from the amount of power fed to an electric motor, the temperature, load, vibration of the electric motor, etc. A later explained neural network or other algorithm is used to realize this.

"Unsupervised learning" gives a large amount of only input data to the learning apparatus to learn how the input data is distributed. Even if not giving corresponding supervised output data, this technique learns the devices compressing, classifying, shaping, etc. the input data. Clustering is possible in parties with similar features in these data sets. By setting some sort of criteria using the results, it is possible to realize prediction of output by allocation of output to make this optimal. Further, as an intermediate issue to take up between "unsupervised learning" and "supervised learning", there is what is called "semi-supervised learning". This is for when there are sets of input and output data for only part of the data and the rest of the data consists of only input. In the present embodiment, it is possible to utilize, by unsupervised learning, data able to be acquired even without actually making the electric motor 2 operate and perform the learning efficiently.

The problem in reinforcement learning is set as follows:
The controller 3 of the electric motor 2 monitors the state of the environment and determines action.
The environment changes according to some sort of rule. Further, one's own actions cause change in the environment.
A reward signal returns with every action.
What is desired to be maximized is the total of the (discounts) rewards over the future.
Learning is started from a state where the result of starting an action would be completely unknown or would only be incompletely known. The controller 3 can obtain the result as data first after the electric motor 2 actually is operated. That is, it is necessary to search for the optimum action by trial and error.
It is also possible to make a state where the learning is performed in advance so as to copy a human operation (technique such as the above-mentioned supervised learning or inverse reinforcement learning) the initial state and start the learning from a good start point.

"Reinforcement learning" is a method of learning for learning actions without being limited to judgment or classification and to thereby learn a suitable action based on interactions given by actions in the environment, that is, for maximizing the reward obtained in the future. This shows that in the present embodiment, it is possible to acquire an action which would have an effect in the future. For example, the explanation will be continued for the case of Q-learning, but the invention is not limited to this.

Q-learning is the method of learning the value Q(s,a) selecting an action "a" under a certain environment state "s". That is, when in a certain state "s", the action "a" with the highest value Q(s,a) may be selected as the most suitable action. However, first, the correct value of the value Q(s,a) for the combination of the state "s" and action "a" is not known at all. Therefore, an agent (action entity) selects various actions "a" under certain states "s" and is given a reward for the actions "a" at that time. Due to this, the agent can select a better action, that is, learn the correct value Q(s,a).

It is desired to maximize the total of the rewards obtained in the future as a result of actions, so finally Q(s,a)=E[$\Sigma\gamma^t r_t$] is aimed at (expected value is obtained when state changes in accordance with optimal action. Of course, this is unknown, so has to be learned while conducting a search). The formula for updating the value Q(s,a) can, for example, be expressed by the following formula:

$$Q(s_t, a_t) \leftarrow Q(s_t, a_t) + \alpha \left( r_{t+1} + \gamma \max_a Q(s_{t+1}, a) - Q(s_t, a_t) \right)$$

Here, $s_t$ indicates the state of the environment at the time "t", while $a_t$ indicates an action at the time "t". Due to the action $a_t$ the state changes to $s_{t+1}$. $r_{t+1}$ indicates the reward received due to the change in state. Further, the term to which "max" is appended is the product of the Q-value multiplied by γ in the case of selecting the action "a" with the highest Q-value in the state $s_{t+1}$ known at that time. "γ" is a parameter of 0<γ≤1 and is called the "discount rate". "α" is the learning coefficient and is made 0<α≤1 in range.

This formula shows the method of updating the evaluated value $Q(s_t, a_t)$ of the action $a_t$ at the state $s_t$ based on the reward $r_{t+1}$ returned as a result of the best action "max a" at the next state due to the result of the reward $r_{t+1}$+action "a" is larger than the evaluated value $Q(s_t, a_t)$ of the action "a" at the state "s", $Q(s_t, a_t)$ is made larger, while conversely if it is smaller, $Q(s_t, a_t)$ is also made smaller. That is, the value of a certain action in a certain state is made to approach the reward immediately returning as a result and the value of the best action in the next state due to that action.

As the method of expression of Q(s,a) on the computer, there are the method of holding the values for all of the state-action pairs (s,a) of the method as a table (action value table) and the method of preparing a function for approximating Q(s,a). In the latter method, the above-mentioned updating formula can be realized by adjusting the parameters of the approximation function by the stochastic gradient descent method or other technique. As the approximation function, a later mentioned neural network can be used.

Figure 3:
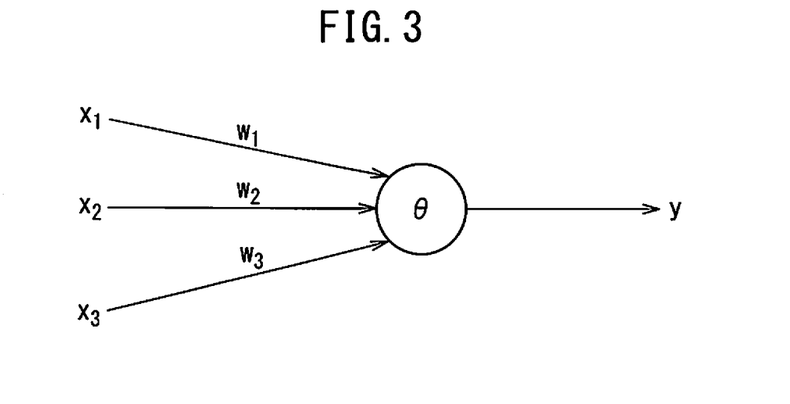
FIG. 3 is a schematic view showing a neuron model.

As the algorithm for approximation of the value function at supervised learning, unsupervised learning, and reinforcement learning, a neural network can be used. A neural network is configured by a processing system, memory, etc. for realizing a neural network simulating a model of neurons such as shown in FIG. 3. FIG. 3 is a schematic view showing a model of the neurons.

As shown in FIG. 3, the neurons output outputs "y" corresponding to a plurality of inputs "x" (here, as one example, input $x_1$ to input $x_3$). The inputs $x_1$ to $x_3$ are multiplied by the weights "w" ($w_1$ to $w_3$) corresponding to the inputs "x". Due to this, the neurons output the outputs "y" expressed by the following formula. Note that the inputs "x", outputs "y", and weights "w" are all vectors.

$$y = f_k(\Sigma_{i=1}^n x_i w_i - \theta)$$

where, θ is the bias and $f_k$ is an activation function.

Figure 4:
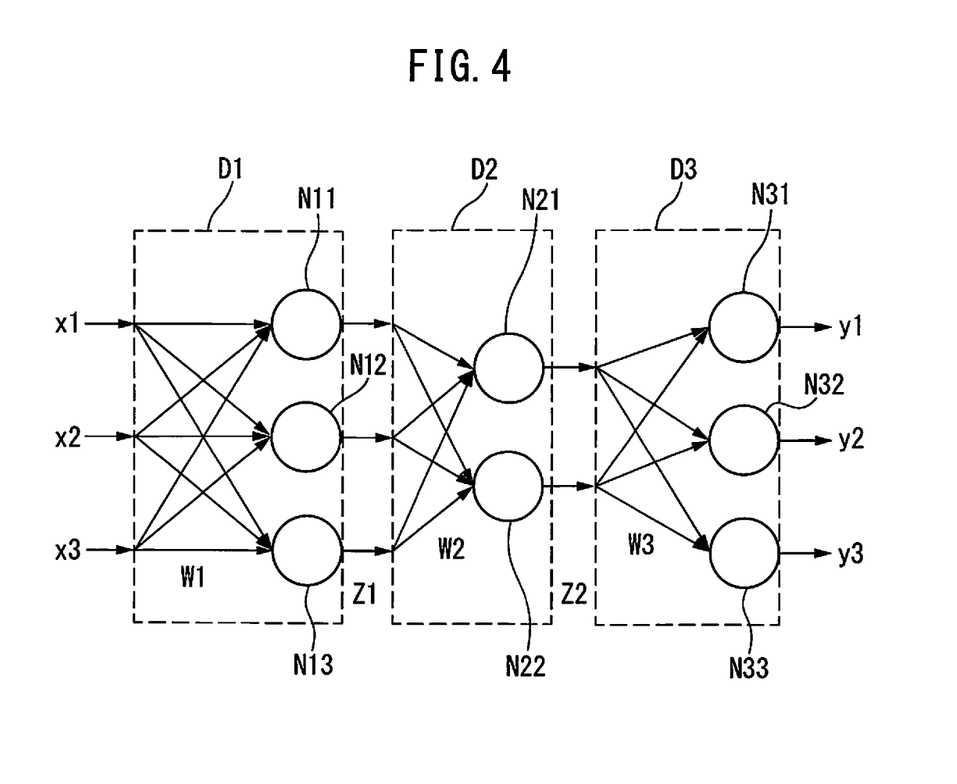
FIG. 4 is a schematic view showing a three-layer neural network model.

Next, a neural network having three layers of weights obtained by assembling the above mentioned neurons will be explained with reference to FIG. 4. FIG. 4 is a schematic view showing a neural network having three layers of weights of D1 to D3.

As shown in FIG. 4, from the left side of the neural network, a plurality of inputs "x" (here, as one example, the input x1 to input x3) are input while from the right side, the results "y" (here, as one example, the results y1 to results y3) are output.

Specifically, the input x1 to input x3 are inputs weighted corresponding to the three neurons N11 to N13. The weights applied to these inputs are labeled as "w1" all together.

The neurons N11 to N13 respectively output z11 to z13. These z11 to z13 are labeled as the "feature vectors z1" all together and can be deemed as vectors extracting the feature quantities of the input vectors. The feature vectors z1 are feature vectors between the weight w1 and the weight w2.

z11 to z13 are inputs weighted corresponding to the two neurons N21, N22. The weights by which these feature vectors are multiplied will be labeled together as "w2".

The neurons N21, N22 respectively output z21 and z22. These will be together labeled as the "feature vectors z2". This feature vectors z2 are feature vectors between the weight w2 and the weight w3.

The feature vectors z21, z22 are input after being weighted corresponding to the three neurons N31 to N33. The weights applied to these feature vectors will be labeled together as "w3".

Finally, the neurons N31 to N33 respectively output the results y1 to the results y3.

The operation of the neural network includes a learning mode and value predicting mode. In the learning mode, a learning data set is used to learn a weight "w" and that parameter is used to correct a command to an electric motor in the predicting mode (for convenience, "predicting" is described, but detecting, classifying, theorizing, and various other tasks are also possible).

In the predicting mode, it is also possible to immediately learn and reflect in the next action the data obtained by actually making the electric motor move (on-line learning) and to use a group of data collected in advance for learning all together and subsequently use those parameters for the detection mode (batch learning). It can be said that every time this intermediate certain degree of data is accumulated, the learning mode is interposed.

The weights w1 to w3 can be learned by using the back propagation method. Information of the error enters from the right side and flows to the left side. The back propagation method is a technique of adjusting (learning) the respective weights for the different neurons so that the difference between an output "y" when an input "x" is input and the true output "y" (supervised) becomes smaller.

Such a neural network can be made three layers or more or increased in layers even more (called "deep learning"). A processing system that performs the feature extraction on the input in stages and performs regression on the results can be automatically obtained from just supervised data.

Therefore, the machine learning apparatus 4 of the present embodiment includes, as shown in FIG. 1, a status observing part 41, learning part 43, and decision-making part 46 for performing the above-mentioned Q-learning. However, the machine learning method applied in the present invention is not limited to Q-learning. Even if applying supervised learning, the value function corresponds to the learning model and the reward corresponds to error.

There is a complicated correlation among the plurality of status variables observed in the present embodiment. For example, if the feed speed of a machine tool increases, the load of the electric motor 2 increases and chatter vibration more easily occurs. If the vibration of the electric motor 2 increases, the positioning precision of the spindle head 5 falls. Further, if the temperature of the spindle head 5 increases, the positioning precision falls due to the effect of heat displacement. In this way, the status variables complicatedly affect each other and can cause a drop in the processing precision.

As opposed to this, in the machine learning apparatus and machine learning method according to the above embodiment, the machine learning apparatus 4 can learn a suitable operating command to an electric motor 2 in accordance with the status variables, so suitable correction processing can be performed under any situation. In this way, according to the present embodiment, there is no longer a need for an operator to perform a correction operation. Suitable correction processing is automatically performed, so a high processing precision can always be realized.

In one embodiment, the learning part may also be configured to learn an operating command in accordance with a set of training data prepared for a plurality of machine tools. The learning part may acquire a set of training data from a plurality of electric motors used on the same work floor or may utilize a set of training data collected from electric motors operating independently on different work floors to learn an operating command to an electric motor.

While an embodiment utilizing reinforcement learning and a neural network for machine learning was explained, another known method, for example, gene expression programming, functional logic programming, a support vector machine, etc., may also be used for machine learning.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the machine learning apparatus and machine learning method according to the present invention, an operating command to an electric motor is learned in accordance with a set of training data prepared based on the status variables. Due to this, there is no need for a correction operation by an operator. The electric motor can be suitably controlled in accordance with the situation. Further, according to the machine tool according to the present invention, the electric motors for driving the spindle and drive shafts are suitably controlled in accordance with the situation, so high processing precision can be realized at all times.

What is claimed is:

1. A machine learning apparatus for learning an operating command to an electric motor in a machine tool,
the machine learning apparatus comprising a processor configured to:
observe an amount of power fed to the electric motor, a temperature of the electric motor, a load of the electric motor, and a vibration of the electric motor as status variables, and
perform learning whether or not it is necessary to correct the operating command to the electric motor according to
the status variables, and
a result of judging whether an abnormality has occurred in the machine tool based on the status variables,
wherein, in said learning, the processor is further configured to
calculate a reward based on
a difference of the amount of power fed and a predetermined amount of power fed,
a difference of the temperature and a predetermined temperature,
a difference of the load and a predetermined load, and
a difference of the vibration and a predetermined vibration,
wherein the processor is configured to calculate the reward by
increasing the reward when said result of judging indicates that no abnormality has occurred in the machine tool based on the status variables, and
decreasing the reward when said result of judging indicates that an abnormality has occurred in the machine tool based on the status variables, and
update a function for determining the operating command based on the reward, and
wherein the electric motor is controlled by the operating command determined by the updated function.

2. The machine learning apparatus according to claim 1, wherein the processor is configured to hold values of all of pairs of the status variables and the operating command as an action value table and update the action value table based on the reward.

3. The machine learning apparatus according to claim 1, wherein the processor is configured to learn the operating command in accordance with a set of training data prepared for a plurality of electric motors.

4. A machine tool, comprising:
a drive shaft or rotating shaft driven by at least one first electric motor;
a spindle driven by at least one second electric motor; and
a machine learning apparatus comprising a processor configured to:
observe an amount of power fed to the electric motors, a temperature of the electric motors, a load of the electric motors, and a vibration of the electric motors as status variables,
perform learning whether or not it is necessary to correct an operating command to the electric motors according to
the status variables, and
a result of judging whether an abnormality has occurred in the machine tool based on the status variables, and
perform at least one of feed speed correction, spindle speed correction, acceleration/deceleration time constant correction, and position correction feed based on results of said learning,
wherein, in said learning, the processor is further configured to
calculate a reward based on
a difference of the amount of power fed and a predetermined amount of power fed,
a difference of the temperature and a predetermined temperature,
a difference of the load and a predetermined load, and
a difference of the vibration and a predetermined vibration,
wherein the processor is configured to calculate the reward by
increasing the reward when said result of judging indicates that no abnormality has occurred in the machine tool based on the status variables, and
decreasing the reward when said result of judging indicates that an abnormality has occurred in the machine tool based on the status variables, and
update a function for determining the operating command based on the reward, and wherein the machine tool is configured to control the first electric motor and the second electric motor in accordance with the operating command determined by the updated function.

5. The machine tool according to claim 4, wherein the processor is further configured to
   observe a temperature and a vibration of a spindle head as additional status variables, and
   calculate the reward based on
      a difference of the temperature of the spindle head and a predetermined temperature, and
      a difference of the vibration of the spindle head and a predetermined vibration.

6. A machine learning method learning an operating command to an electric motor in a machine tool, the machine learning method comprising
   observing an amount of power fed to the electric motor, a temperature of the electric motor, a load of the electric motor, and a vibration of the electric motor as status variables; and
   learning whether or not it is necessary to correct the operating command to the electric motor according to the status variables, and
      a result of judging whether an abnormality has occurred in the machine tool based on the status variables,
   wherein said learning comprises:
      calculating a reward based on
         a difference of the amount of power fed and a predetermined amount of power fed,
         a difference of the temperature and a predetermined temperature,
         a difference of the load and a predetermined load, and
         a difference of the vibration and a predetermined vibration,
         wherein said calculating the reward comprises
            increasing the reward when said result of judging indicates that no abnormality has occurred in the machine tool based on the status variables, and
            decreasing the reward when said result of judging indicates that an abnormality has occurred in the machine tool based on the status variables, and
      updating a function for determining the operating command based on the reward, and
   wherein the method further comprises controlling the electric motor by the operating command determined by the updated function.

\* \* \* \* \*